(12) United States Patent
Wei

(10) Patent No.: US 10,078,736 B2
(45) Date of Patent: Sep. 18, 2018

(54) COMPUTERIZED SYSTEM AND METHOD FOR IMPLEMENTING DIGITAL RIGHTS MANAGEMENT

(71) Applicant: Alibaba Group Holding Limited, Grand Cayman (KY)

(72) Inventor: Yusong Wei, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 171 days.

(21) Appl. No.: 15/085,323

(22) Filed: Mar. 30, 2016

(65) Prior Publication Data

US 2016/0321436 A1    Nov. 3, 2016

(30) Foreign Application Priority Data

Apr. 28, 2015 (CN) .......................... 2015 1 0206514

(51) Int. Cl.
  *G06F 21/10* (2013.01)
  *G06F 9/445* (2018.01)
  *G06F 9/455* (2018.01)

(52) U.S. Cl.
  CPC .......... *G06F 21/10* (2013.01); *G06F 9/44526* (2013.01); *G06F 9/45529* (2013.01)

(58) Field of Classification Search
  CPC ................................................ H04L 2209/603
  See application file for complete search history.

(56) References Cited

U.S. PATENT DOCUMENTS

| 6,327,652 | B1 | 12/2001 | England et al. |
| 6,330,670 | B1 | 12/2001 | England et al. |
| 7,957,529 | B2 | 6/2011 | Brew et al. |
| 8,516,273 | B2 | 8/2013 | Vijay |
| 8,613,108 | B1 | 12/2013 | Aggarwal |
| 8,640,256 | B2 | 1/2014 | Cross et al. |

(Continued)

FOREIGN PATENT DOCUMENTS

WO    WO 2013166418    11/2013

OTHER PUBLICATIONS

International Search Report and Written Opinion to corresponding International Application No. PCT/US16/25200 dated Jun. 30, 2016.

*Primary Examiner* — Josnel Jeudy

(74) *Attorney, Agent, or Firm* — James J. DeCarlo; Greenberg Traurig, LLP

(57) ABSTRACT

Disclosed are systems and methods for improving interactions with and between computers in content communicating, rendering, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods The disclosed systems and methods enable the seamless, and adaptable implementation of digital rights management technology on a client device despite variations in the version, languages, programs executing on differing linked devices. The disclosed systems and methods enable the rendering of content via encryption and decryption of the content, which protects the digital media content on the client end.

20 Claims, 7 Drawing Sheets

(56) References Cited

U.S. PATENT DOCUMENTS

| | | |
|---|---|---|
| 8,661,255 B2 | 2/2014 | Pedlow et al. |
| 8,719,586 B1 | 5/2014 | Paleja et al. |
| 8,793,793 B2 | 7/2014 | Buchanan |
| 8,943,605 B1 | 1/2015 | Martin et al. |
| 8,972,726 B1 | 3/2015 | Poling |
| 9,135,411 B2 | 9/2015 | Wang |
| 9,626,664 B2 * | 4/2017 | Bouey .................... G06Q 20/10 |
| 2012/0066494 A1 * | 3/2012 | Lee ........................ G06F 21/10 |
| | | 713/160 |
| 2012/0079578 A1 * | 3/2012 | Dachiraju .......... H04N 21/2225 |
| | | 726/7 |
| 2013/0132232 A1 * | 5/2013 | Pestoni .................. H04L 63/10 |
| | | 705/26.25 |
| 2014/0033265 A1 | 1/2014 | Leeds et al. |
| 2014/0289515 A1 | 9/2014 | Sorotokin et al. |
| 2014/0304790 A1 | 10/2014 | Bi et al. |
| 2017/0054721 A1 * | 2/2017 | Meriac ................... H04L 63/10 |

* cited by examiner

COMPUTERIZED SYSTEM AND METHOD FOR IMPLEMENTING DIGITAL RIGHTS MANAGEMENT

CROSS-REFERENCE TO RELATED APPLICATIONS

This application claims the benefit of priority from Chinese Patent Application No. 201510206514.7, filed on Apr. 28, 2015, entitled "Method of Digital Copyright Management, Client and System Thereof," which is incorporated herein in its entirety by reference.

TECHNICAL FIELD

The present disclosure generally relates to improving the performance of content providing, recommending, generating and/or hosting computer systems and/or platforms, and more particularly, to systems and methods for implementing non-native functionality to such systems and/or platforms for implementing digital rights management.

BACKGROUND

Digital rights management (DRM) is a new technology developed with respect to the broad growth of electronic audio and video programs on the Internet. An objective of the digital rights management is to protect digital media content from being played and duplicated without authorization.

Based on the attention paid to the importance of DRM, many standardized global organizations and manufacturers independently or jointly have conducted research on DRM technology, introduced technical standards and solutions of their own, encapsulated the solutions, and provided the encapsulated solutions for use in the form of a toolkit (such as SDK).

Typical solutions of DRM technology of the above standardization organizations and manufacturers generally comprise a server and a client. The server is configured to store encrypted digital media content and a license thereof, and the client end is configured to decrypt the encrypted digital media content according to the obtained license. For example, the standard and solution of the China DRM technology is published by the China DRM Forum, the standard and solution of the Marlin DRM technology is jointly developed by Intertrust, Panasonic, Philips, Sony, and Samsung, and the standard and solution of the OMA DRM technology is developed by the Open Mobile Alliance.

In conventional systems, during the process of decrypting on the client end, the kits provided by the above standardization organizations and manufacturers need to be used. However, under some circumstances, a player on the client end is implemented by using one language, and the kits provided by the above standardization organizations and manufacturers are implemented by using another language. This can create a problem of compatibility between computer languages as the player on the client end (for example, a video player, an audio player, or the like) may not call the kits provided by the standardization organizations and manufacturers, which can result in the client end (based on the player) not being able to protect the digital media content via DRM technology.

For example, some clients are based on a Flash player, and the Flash player is normally implemented by using computer language such as a Flash ActionScript (Flash AS). In this way, the Flash player may not directly call a software development kit (SDK) implemented by using C++ language. However, ExpressPlay is a solution of Marlin DRM, and the SDK thereof is developed and implemented using the C++ language. Therefore, a Flash client cannot protect digital media content based on Marlin DRM by using an ExpressPlay SDK in the related art.

SUMMARY

According to some embodiments, the present disclosure provides systems and methods for implementing digital rights management. According to some embodiments, the disclosed systems and methods enable digital media content to be protected using DRM technology on the client end.

To overcome the existing technical problems in the art, the disclosed systems and methods enable the implementation of DRM technology on the client end as follows.

In accordance with some embodiments of the present disclosure, a method for implementing digital rights management is provided, which includes:

upon acquiring a first address and token, sending, by a playing module, the first address and token to a browser plugin module, the first address and token being respectively an address and token of encrypted content;

acquiring and sending, by the browser plugin module, the first address and token to a decrypting module;

upon acquiring the first address and token, and a license according to the token, generating, by the decrypting module, a second address according to the first address and the license, and sending the second address to the browser plugin module, the second address being an address of decrypted content;

acquiring and sending, by the browser plugin module, the second address to the playing module; and acquiring, by the playing module, the second address, and playing the decrypted content of the second address.

According to another non-limiting embodiment of the instant disclosure, a method for implementing digital rights management is provided, which includes:

upon acquiring a first address and token, sending, by a playing module, the first address and token to a browser plugin module, the first address and token being respectively an address and token of encrypted content;

acquiring and sending, by the browser plugin module, the first address and token to a decrypting module;

upon acquiring the first address and token, and a license according to the token, sending, by the decrypting module, information indicating that the license is successfully acquired to the browser plugin module;

acquiring and sending, by the browser plugin module, the information to a JavaScript component; and acquiring, by the JavaScript component, the information, and requesting the second address from the decrypting module through the browser plugin module, the second address being an address of decrypted content;

upon acquiring the request, generating, by the decrypting module, the second address according to the first address and the license, and sending the second address to the browser plugin module;

acquiring and sending, by the browser plugin module, the second address to the JavaScript component;

acquiring and sending, by the JavaScript component, the second address to the playing module; and acquiring, by the playing module, the second address, and playing the decrypted content of the second address.

According to some embodiments of the instant disclosure, a client (device and/or engine) for implementing digital rights management is provided, which includes:

a playing module, configured to, upon acquiring a first address and token, send the first address and token to a first browser plugin module, and acquire a second address and play decrypted content of the second address; the first address and token being respectively an address and token of encrypted content, and the second address being an address of decrypted content;

a first browser plugin module, configured to acquire and send the first address and token to a first decrypting module; and acquire and send the second address to the playing module; and a first decrypting module, configured to, upon acquiring the first address and token, and a license according to the token, generate a second address according to the first address and license, and send the second address to the first browser plugin module.

According to another non-limiting embodiment of the instant disclosure, a client (device and/or engine) for implementing digital rights management is provided, which includes:

a playing module, configured to, upon acquiring a first address and token, send the first address and token to a second browser plugin module, and acquire a second address and play decrypted content of the second address; the first address and token being respectively an address and token of encrypted content, and the second address being an address of decrypted content;

a second browser plugin module, configured to acquire and send the first address and token to a first decrypting module; and acquire and send the second address to a first JavaScript component;

a first JavaScript component, configured to acquire and send the second address to the playing module; and a first decrypting module, configured to, upon acquiring the first address and token, and a license according to the token, generate a second address according to the first address and license, and send the second address to the second browser plugin module.

According to yet another non-limiting embodiment of the instant disclosure, a client (device and/or engine) for implementing digital rights management is provided, which includes:

a playing module, configured to, upon acquiring a first address and token, send the first address and token to a third browser plugin module, and acquire a second address and play decrypted content of the second address; the first address and token being respectively an address and token of encrypted content, and the second address being address of decrypted content;

a third browser plugin module, configured to acquire and send the first address and token to a second decrypting module, send information indicating that a license is successfully acquired to a second JavaScript component, and acquire and send the second address to the playing module;

a second JavaScript component, configured to acquire the information, request the second address from the second decrypting module through the third browser plugin module, and acquire and send the second address to the playing module; and a second decrypting module, configured to, upon acquiring the first address and token, and a license according to the token, send the information to the third browser plugin module, and upon acquiring the request, generate a second address according to the first address and license, and send the second address to the third browser plugin module.

According to some embodiments of the instant disclosure, a system for implementing digital rights management is provided, which includes: a client, a first server and a second server; wherein the first server is configured to acquire an identity of the encrypted content, acquire the first address and token according to the identity, and send the first address and token to the playing module; and the second server is configured to acquire the token, generate the license according to the token, and send the license to the first decrypting module.

According to another non-limiting embodiment of the instant disclosure, a system for implementing digital rights management is provided, which includes: a client, a first server and a third server; wherein the first server is configured to acquire an identity of the encrypted content, acquire the first address and token according to the identity, and send the first address and token to the playing module; and the third server, configured to acquire the token, generate the license according to the token, and send the license to the second decrypting module.

According to some embodiments, as seen from the technical solutions provided by the embodiments of the present disclosure, data transfer between the playing module and the browser plugin module, and between the browser plugin module and the decrypting module indirectly implements the data transfer between the playing module and the decrypting module, thereby protecting the digital media content by using DRM technology on the client end.

In accordance with one or more embodiments, a system is provided that comprises one or more computing devices (also referred to as a "device") configured to provide functionality in accordance with such embodiments. In accordance with one or more embodiments, functionality is embodied in steps of a method performed by at least one computing device. In accordance with one or more embodiments, program code (or program logic or computer-executable instructions) is executed by a processor(s) of a computing device to implement functionality in accordance with one or more such embodiments is embodied in, by and/or on a non-transitory computer-readable medium.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method as discussed herein.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
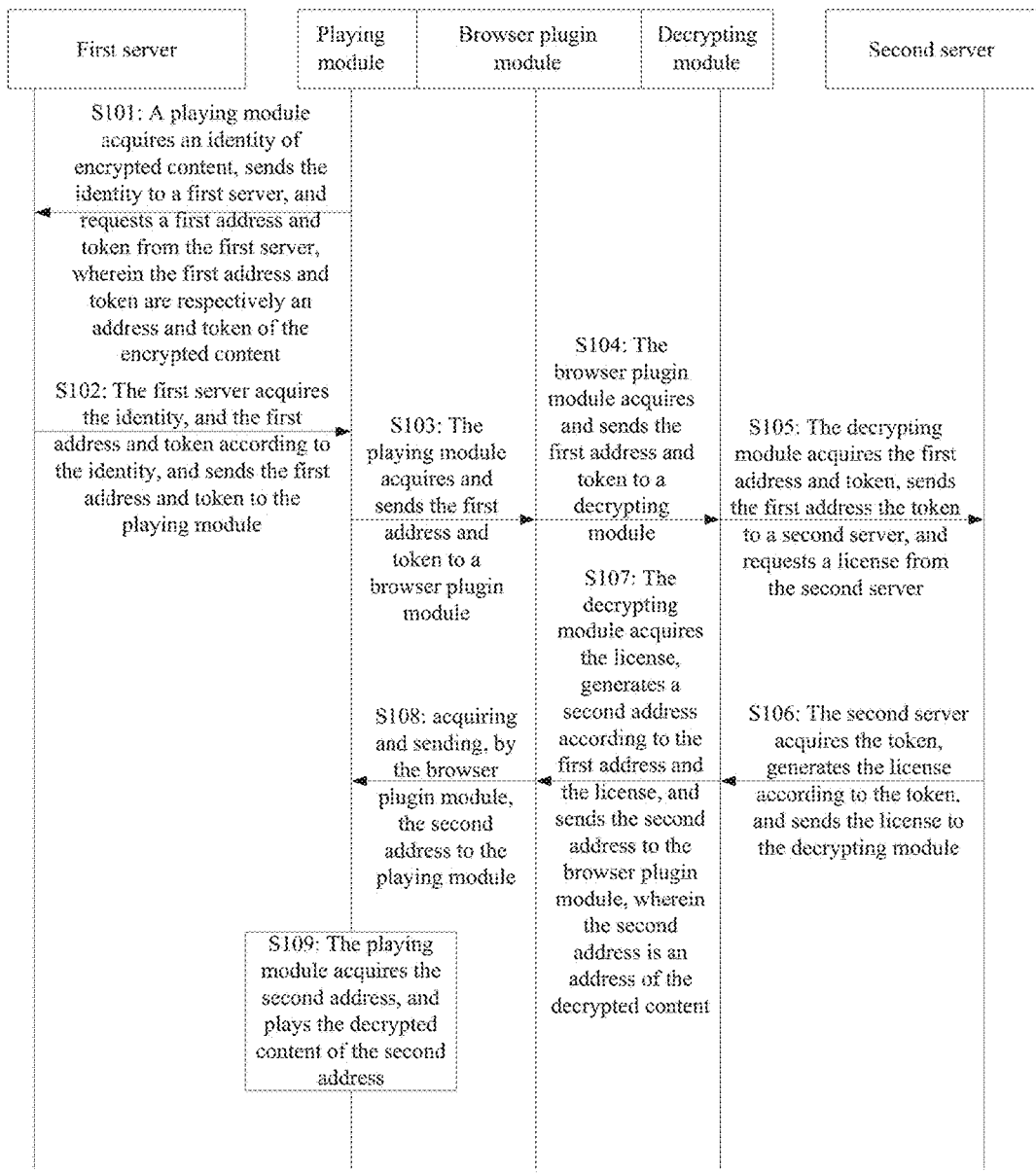
FIG. 1 is a flowchart of a method for implementing digital rights management according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which executed via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows®, iOS® or Linux®, or a mobile operating system, such as iOS, Android®, or Windows® Mobile, or the like.

A client device may include or may execute a variety of possible applications, such as a client software application enabling communication with other devices, such as communicating one or more messages, such as via email, short message service (SMS), or multimedia message service (MMS), including via a network, such as a social network, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Certain embodiments will now be described in greater detail with reference to the figures. According to some embodiments, as discussed herein, systems and methods for implementing digital rights management may be achieved on such devices as, but not limited to, a desktop computer, a laptop computer, a tablet computer, a smart phone, a personal digital assistant (PDA), a wearable smart device, and the like. One embodiment illustrating the systems and methods for implementing digital rights management according to the present disclosure is described in detail, as illustrated in FIG. 1.

FIG. 1, according to some embodiments, details steps S101-S109, as discussed herein, In step S101: A playing module acquires an identity of encrypted content, sends the identity to a first server, and requests a first address and token from the first server. The first address and token are respectively an address and token of the encrypted content.

According to some embodiments, upon acquiring an operation instruction about the encrypted content, the playing module may first acquire the identity of the encrypted content, and then send the identity to the first server and request the first address and token from the first server. According to some embodiments, the operation instruction may comprise such operation instructions as a playing instruction, and the like. For example, upon acquiring the playing instruction about the encrypted content, the playing module may search for a field corresponding to a Video identifier (VideoID) in a webpage source code, and use a value of the field as the identity of the encrypted content.

According to some embodiments, the playing module includes, but is not limited to, a Flash Player® of the Adobe Company, a QuickTime® player of Apple Inc., and a Windows Media Player® of Microsoft Corporation.

According to some embodiments, the first server may be used to store the encrypted content, and a key and identity (ID) of the encrypted content. The encrypted content comprises encrypted video and encrypted audio. For example, the first server may be a server of video resources, and is used to save the encrypted video, and the key and identity of the encrypted video. In another example, the first server may be a server providing audio resources, and is used to store the encrypted audio, and the key and identity of the encrypted audio.

In step S102: The first server acquires the identity, and the first address and token according to the identity, and sends the first address and token to the playing module.

According to some embodiments, the first server may save the encrypted content, and the corresponding key and identity of encrypted content, and, in some embodiments, may also store a mapping relationship between the key and identity and the encrypted content.

After acquiring the identity sent by the playing module, the first server acquires the key corresponding to the identity according to the mapping relationship between the key and identity. The first server generates the token through calculation according to the identity and key by using any known or to be known algorithm for performing such calculation. Subsequently, the first server acquires the encrypted content corresponding to the identity according to the mapping relationship between the identity and the encrypted content. Upon acquiring the encrypted content corresponding to the identity, the first server generates the first address according to the encrypted content. Finally, the first server returns the first address and token to the playing module.

According to some embodiments, the first address may be a uniform resource locator (URL) address of the encrypted content. A format of the URL can be any type of URL format, such as: protocol type://server address (with a port number if necessary)/path/file name. For example, protocols can include, but are not limited to, the Streaming Protocol, HyperText Transfer Protocol (HTTP), eDonkey2000 Network (Ed2k), File Transfer Protocol (FTP), File Protocol, Hyper Text Transfer Protocol over Secure Socket Layer (HTTPS) Protocol, and on the like. The Streaming Protocol includes, for example, the Real-time Transport Protocol (RTP), Real-time Transport Control Protocol (RTCP), Real Time Streaming Protocol (RTSP), Real Time Messaging Protocol (RTMP), Microsoft Media Server Protocol (MMS), HTTP Live Streaming (HLS), and on the like.

The token is a string including specific information (for example, user name, period of validity, and some exclusive information).

In step S103: The playing module acquires and sends the first address and token to a browser plugin module.

According to some embodiments, upon acquiring the first address and token returned by the first server, the playing module may communicate with the browser plugin module, and send the first address and token to the browser plugin module.

According to some embodiments, different playing modules may communicate with the browser plugin module in any known or to be known ways of communicating with devices over network.

In a non-limiting example, the playing module may be a Flash player of the Adobe Company. A programming language of the Flash player is generally the Flash ActionScript. The Flash ActionScript provides an ExternalInterface class. The Flash player may communicate with the browser plugin module based on the ExternalInterface class. For example, when the Flash player of the Adobe Company is used on the playing module, the playing module is generally achieved by the FlashActionScript. The playing module implemented based on the FlashActionScript may send the first address and token to the browser plugin module via the function ExternalInterface.addCallBack( ).

According to some embodiments, different browsers may use browser plugin modules based on different programming architecture. For example, browsers based on a Gecko engine such as Netscape Navigator®, Mozilla® Suite, Mozilla® SeaMonkey, Mozilla Firefox® and the like, and browsers based on a webkit engine such as Apple Safari®, Google Chrome® and the like, may use a browser plugin based on a Netscape® Plugin Application Programming Interface (NPAPI). Browsers based on an IE kernel may use a browser plugin based on ActiveX.

In step S104: The browser plugin module acquires and sends the first address and token to a decrypting module.

According to some embodiments, upon acquiring the first address and token sent by the playing module, the browser plugin module may communicate with the decrypting module, and send the first address and token to the decrypting module. The browser plugin module may encapsulate the process of FIG. 1, which, in some embodiments, may need to be exposed in the decrypting module, such that the steps discussed herein can be called by other modules (for example, the playing module).

According to some embodiments, the decrypting module may include a software development kit (SDK). The SDK is generally provided by a third party such as a standardization organization or manufacturer. The SDK is a set of development tools of creating application software for specific software package, software framework, hardware platform, operation system or the like, and includes some files providing interface for an application program, for example, DLL file or the like. For example, the decrypting module may comprise an ExpressPlay SDK, Windows Media DRM SDK and the like. The ExpressPlay SDK is a software development kit provided by Marlin DRM, and the Windows Media DRM SDK is a software development kit provided by Windows Media DRM.

For example, if the decrypting module is the ExpressPlay SDK, since both the browser plugin module and the ExpressPlay SDK may be implemented by using the C++ language, the browser plugin module may send the first address and token to the ExpressPlay SDK through function calling and parameter transfer.

In step S105: The decrypting module acquires the first address and token, sends the first address the token to a second server, and requests a license from the second server.

According to some embodiments, upon acquiring the first address and token sent by the browser plugin module, the decrypting module stores the first address, sends the token to the second server, and requests the license from the second server.

In step S106: The second server acquires the token, generates the license according to the token, and sends the license to the decrypting module.

According to some embodiments, the second server acquires the token sent by the decrypting module, and generates the license by using any known or to be known algorithm for generating a license, which is performed according to the token after acquiring the request sent by the decrypting module for acquiring the license. Subsequently, the second server sends the license to the decrypting module.

In step S107: The decrypting module acquires the license, generates a second address according to the first address and the license, and sends the second address to the browser plugin module, wherein the second address is an address of the decrypted content.

According to some embodiments, the decrypting module may acquire the license returned by the second server, and store first address. The decrypting module may download the encrypted content from the first server, decrypt the download encrypted content by using the license according to any known or to be known technique for performing decryption in order to obtain the encrypted content, and generate the second address according to the decrypted content. Finally, the decrypting module sends the second address to the browser plugin module. The second address may comprise an HTTP live streaming (HLS) URL, and the like. For example, when the encrypted content in step S101 is the encrypted video, correspondingly, the decrypted content in step S107 is the decrypted video. In another non-limiting example, when the encrypted content in step S101 is the encrypted audio, correspondingly, the decrypted content in step S107 is the decrypted audio.

In some embodiments, the decrypting module may download the encrypted content from the first server according to the first address. When downloading the encrypted content, the decrypting module may decrypt the partially downloaded encrypted content according to the license to obtain the decrypted content, and then generate the second address according to the decrypted content. In this way, the decrypting module may decrypt the partially downloaded encrypted content while downloading the remaining encrypted content, thereby saving time.

In step S108: acquiring and sending, by the browser plugin module, the second address to the playing module.

According to some embodiments, the browser plugin module may send the second address to a JavaScript® component upon acquiring the second address. Upon acquiring the second address, the JavaScript component may send the second address to the playing module.

By way of a non-limiting example, when the browser plugin module uses a browser plugin module based on ActiveX, the process that the browser plugin module sends the second address to the JavaScript component is described as follows.

The ActiveX-based browser plugin may acquire a Windows object through a COM component, and then access the function disclosed by the JavaScript component through the Windows object, so as to send the second address to the JavaScript component. The COM component may convert the second address into a data type that may be identified by the JavaScript component.

When the browser plugin module uses an NPAPI-based browser plugin, the browser plugin may call the function disclosed by the JavaScript component by using the function NPN_GetURL( ), so as to send the second address to the JavaScript component.

The JavaScript component may encapsulate the steps executed by the playing module. After the encapsulation, the JavaScript component may provide a graphical user interface (GUI) for managing the playing module. Via this interface, the JavaScript component may send the second address to the playing module. For example, when the Flash player of the Adobe company is used on the playing module, the playing module is generally achieved by the FlashActionScript. The playing module implemented based on the FlashActionScript may provide the methods which need to be disclosed to the JavaScript component by using the function ExternalInterface.addCallBack( ) (which is generally provided by the ExternalInterface class).

In step S109: The playing module acquires the second address, and plays the decrypted content of the second address.

According to some embodiments, the playing module may play the decrypted content corresponding to the second address upon acquiring the second address sent by the browser plugin module.

In some embodiments, in step S107, the decrypting module may download the encrypted content from the first server according to the first address, decrypt the downloaded encrypted content according to the license to obtain the decrypted content, and generate the second address according to the decrypted content. Correspondingly, in step S109, the playing module may acquire the second address, and play the decrypted content according to the second address.

In some embodiments, in step S107, the decrypting module may decrypt the partially downloaded encrypted content while downloading the remaining encrypted content. Correspondingly, in step S109, the playing module may acquire the second address, and play the decrypted content according to the second address. In this way, the decrypting module downloads the encrypted content and decrypts the partially downloaded encrypted content, and at the same time the playing module may play the decrypted content according to the second address.

According to the embodiments discussed in relation to FIG. 1, data transfer between the playing module and the browser plugin module, and between the browser plugin module and the decrypting module indirectly implements the data transfer between the playing module and the decrypting module, thereby protecting the digital media content by using DRM technology on the client end.

In some embodiments, it should be noted that the first server and the second server may be the same server in the embodiments discussed above in relation to FIG. 1. In some embodiments, the server may be marked as a digital media license server. The digital media license server may be used to acquire the identity of the encrypted content, acquire the first address and token according to the identity, and send the first address and token to the playing module; acquire the token, generate the license according to the token, and send the license to the decrypting module.

Figure 2:
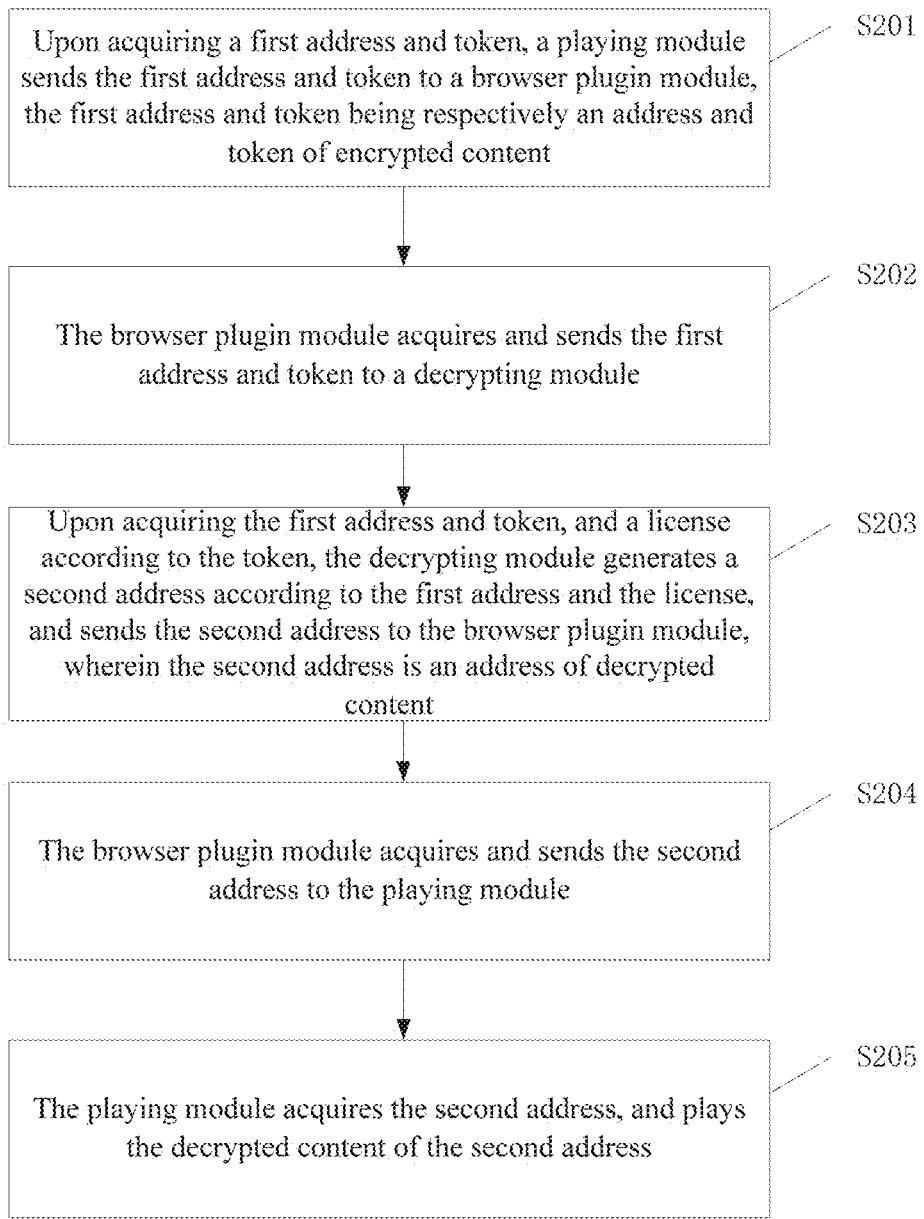
FIG. 2 is a flowchart of a method for implementing digital rights management according to some embodiments of the present disclosure.

The embodiment corresponding to FIG. 1 uses the client end as an execution subject, which forms the basis for the embodiments discussed in relation to in FIG. 2, as discussed below. FIG. 2, according to some embodiments, details steps S201-S205, In step S201: Upon acquiring a first address and token, a playing module sends the first address and token to a browser plugin module, wherein the first address and token are respectively an address and token of encrypted content.

In step S202: The browser plugin module acquires and sends the first address and token to a decrypting module.

In step S203: Upon acquiring the first address and token, and a license according to the token, the decrypting module generates a second address according to the first address and the license, and sends the second address to the browser plugin module, wherein the second address is an address of decrypted content.

In step S204: The browser plugin module acquires and sends the second address to the playing module.

In step S205: The playing module acquires the second address, and plays the decrypted content of the second address.

Figure 3:
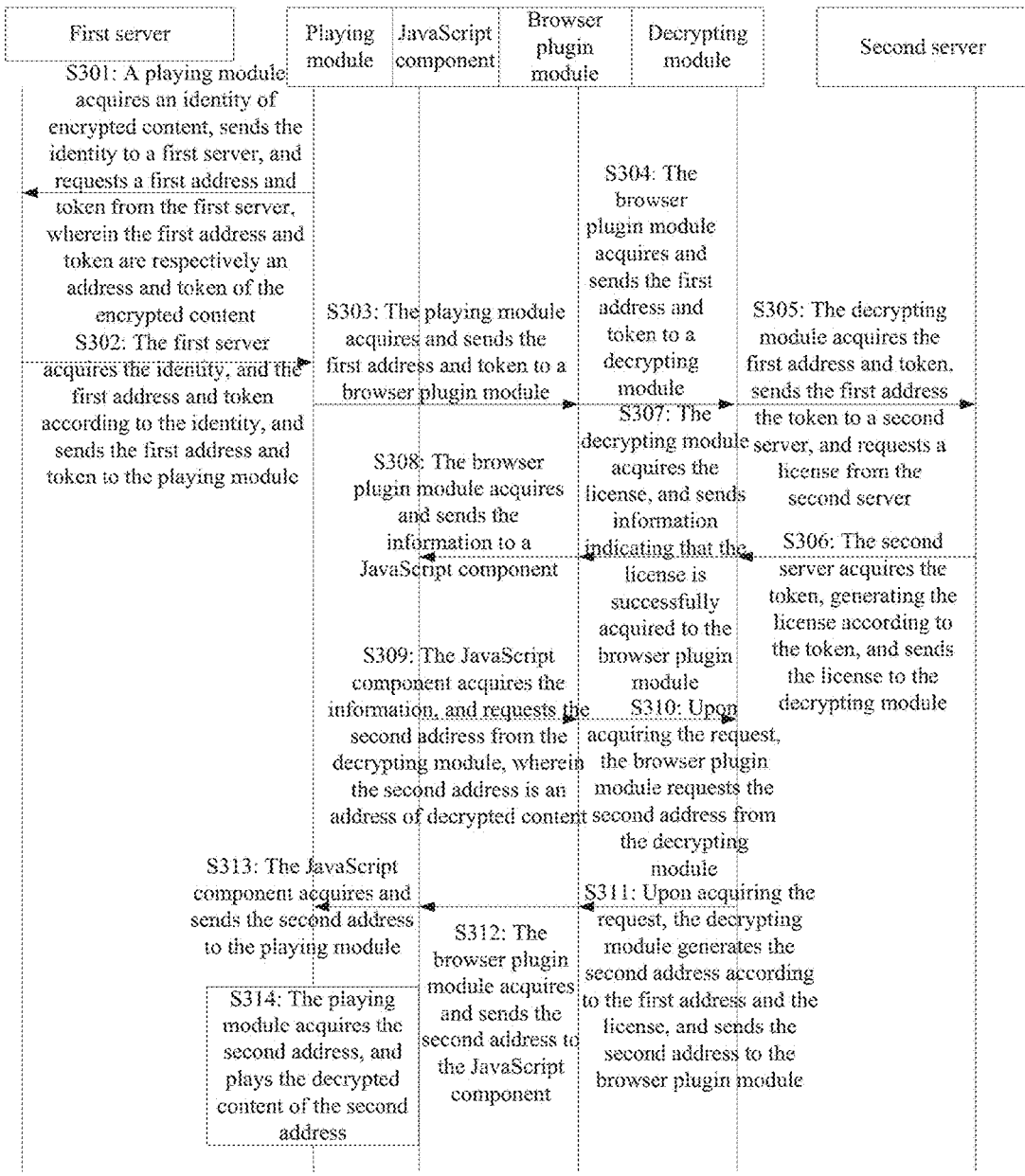
FIG. 3 is a flowchart of a method for implementing digital rights management according to some embodiments of the present disclosure.

Turning to FIG. 3, which details steps S301-S314, as discussed below, non-limiting embodiments are discussed for implementing digital rights management.

In step S301: A playing module acquires an identity of encrypted content, sends the identity to a first server, and requests a first address and token from the first server, wherein the first address and token are respectively an address and token of the encrypted content.

In step S302: The first server acquires the identity, and first address and token according to the identity, and sends the first address and token to the playing module.

In step S303: The playing module acquires and sends the first address and token to a browser plugin module.

In step S304: The browser plugin module acquires and sends the first address and token to a decrypting module.

In step S305: The decrypting module acquires the first address and token, sends the first address the token to a second server, and requests a license from the second server.

In step S306: The second server acquires the token, generating the license according to the token, and sends the license to the decrypting module.

In step S307: The decrypting module acquires the license, and sends information indicating that the license is successfully acquired to the browser plugin module.

According to some embodiments, upon the return of the license by the second server, the decrypting module may communicate with the browser plugin module, so as to send the information indicating that the license is successfully acquired to the browser plugin module.

In step S308: The browser plugin module acquires and sends the information to a JavaScript component.

According to some embodiments, upon receiving the information indicating that the license sent by the decrypting module is successfully acquired, the browser plugin module may communicate with the JavaScript component, so as to send the information indicating that the license is successfully acquired to the JavaScript component.

In step S309: The JavaScript component acquires the information, and requests the second address from the decrypting module, wherein the second address is an address of decrypted content.

According to some embodiments, upon receiving the information indicating that the license sent by the decrypting module is successfully acquired, the JavaScript module may communicate with the browser plugin module, so as to request the second address from the browser plugin module.

In step S310: Upon acquiring the request, the browser plugin module requests the second address from the decrypting module.

According to some embodiments, upon receiving the request sent by the JavaScript component for acquiring the second address, the browser plugin module may communicate with the decrypting module, so as to request the second address from the decrypting module.

In step S311: Upon acquiring the request, the decrypting module generates the second address according to the first address and the license, and sends the second address to the browser plugin module.

In step S312: The browser plugin module acquires and sends the second address to the JavaScript component.

In step S313: The JavaScript component acquires and sends the second address to the playing module.

In step S314: The playing module acquires the second address, and plays the decrypted content of the second address.

According to the embodiments discussed in relation to FIG. 3, upon acquiring the license from the second server, the decrypting module sends information indicating that the license is successfully acquired to the JavaScript component through the browser plugin module. Subsequently, the JavaScript component requests a second address from the decrypting module through the browser plugin module. The JavaScript component may encapsulate the methods executed by the playing module, and provide an interface for managing the playing module. Therefore, the JavaScript component may acquire the working state of the playing module. After the playing module well prepares for playing, the JavaScript component actively initiates a request for acquiring the second address. Therefore, as compared against the embodiments discussed in relation to FIG. 1, the embodiments discussed in relation to FIG. 3 may prevent the playing module from playing the second address while it is busy, which thereby improves the smoothness of playing the decrypted content by the playing module.

Figure 4:
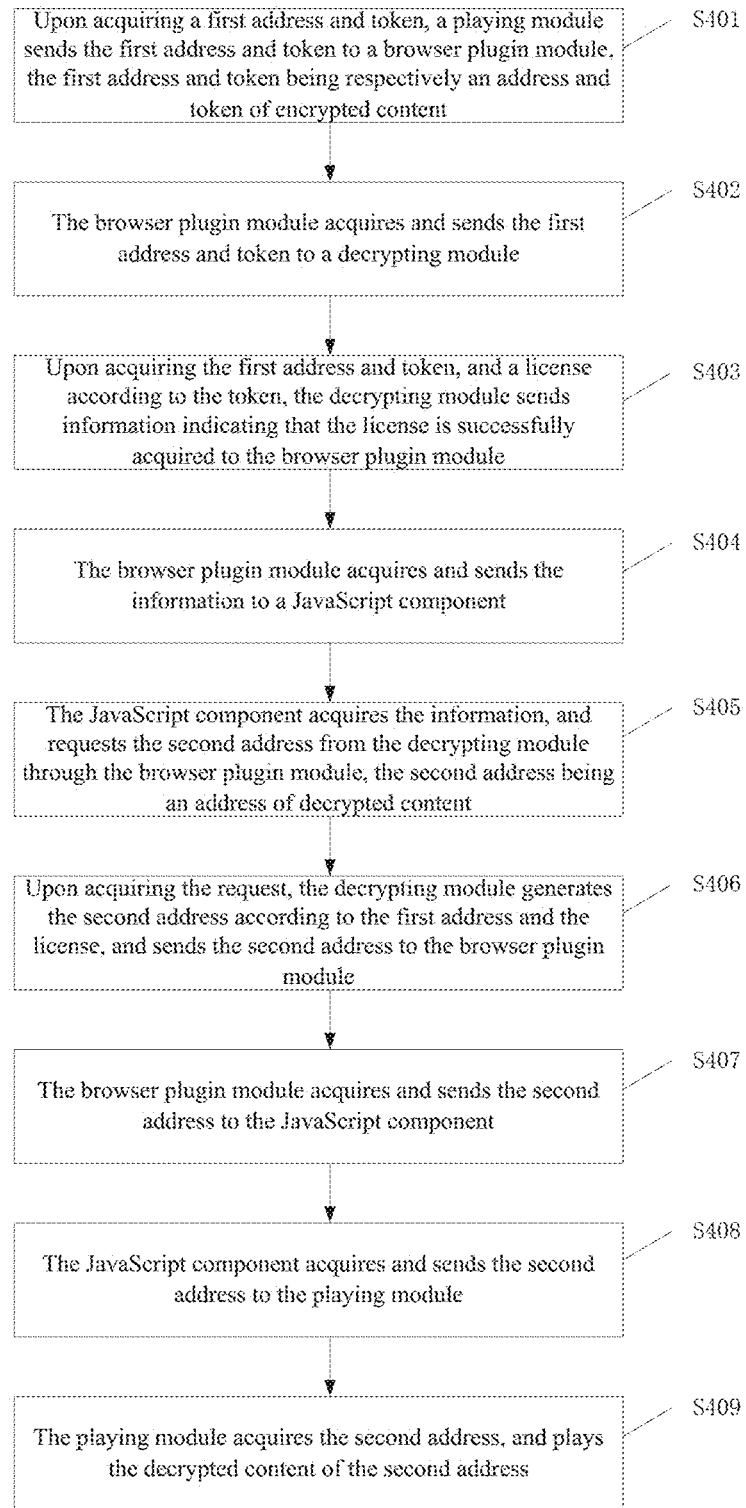
FIG. 4 is a flowchart of a method for implementing digital rights management according to some embodiments of the present disclosure.

According to some embodiments, in relation to FIG. 3, steps S301-S314 of FIG. 3 uses the client end as an execution subject, which forms the embodiments discussed below in relation to FIG. 4. FIG. 4 details steps S401-S409, as discussed below.

In step S401: Upon acquiring a first address and token, a playing module sends the first address and token to a browser plugin module, wherein the first address and token are respectively an address and token of encrypted content;

In step S402: The browser plugin module acquires and sends the first address and token to a decrypting module.

In step S403: Upon acquiring the first address and token, and a license according to the token, the decrypting module sends information indicating that the license is successfully acquired to the browser plugin module.

In step S404: The browser plugin module acquires and sends the information to a JavaScript component.

In step S405: The JavaScript component acquires the information, and requests the second address from the decrypting module through the browser plugin module, wherein the second address is an address of decrypted content.

According to some embodiments, upon acquiring the information sent by the browser plugin module, the JavaScript component requests the second address from the browser plugin module. Upon acquiring the request, the browser plugin module may request the second address from the decrypting module.

In step S406: Upon acquiring the request, the decrypting module generates the second address according to the first address and the license, and sends the second address to the browser plugin module.

In step S407: The browser plugin module acquires and sends the second address to the JavaScript component.

In step S408: The JavaScript component acquires and sends the second address to the playing module.

In step S409: The playing module acquires the second address, and plays the decrypted content of the second address.

Figure 5:
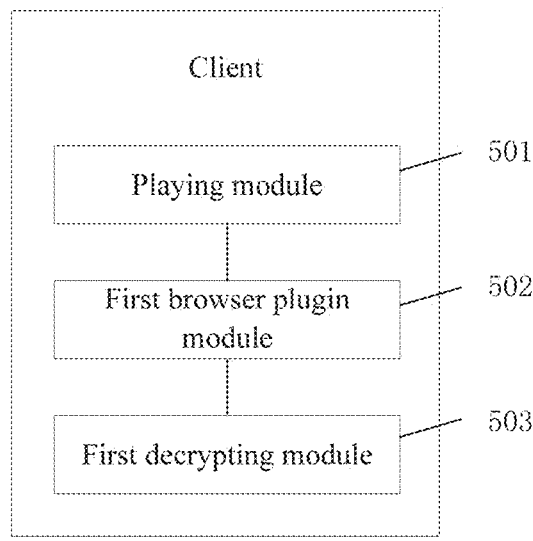
FIG. 5 is a schematic functional structural diagram of a client for implementing digital rights management according to some embodiments of the present disclosure.

Turning to FIG. 5, embodiments for a client implementing digital rights management are disclosed. As illustrated in FIG. 5, which is a non-limiting schematic functional structural diagram of a client for implementing digital rights management, includes a client end comprising a playing module 501, a first browser plugin module 502, and a first decrypting module 503. The client can be, in some embodiments, a special purpose machine or processor, and could be a server, a user's computing device, or any combination thereof. It should be understood that the modules (or engines) discussed herein are non-exhaustive, as additional or fewer engines and/or modules may be applicable to the embodiments of the systems and methods discussed. The operations, configurations and functionalities of each module, and their role within embodiments of the present disclosure will be discussed herein.

The playing module 501 is configured to, upon acquiring a first address and token, send the first address and token to the first browser plugin module, and acquire a second address and play decrypted content of the second address; wherein the first address and token are respectively an address and token of encrypted content, and the second address is address of decrypted content.

The first browser plugin module 502 is configured to acquire and send the first address and token to a first decrypting module; and acquire and send the second address to the playing module.

The first decrypting module 503 is configured to, upon acquiring the first address and token, and a license according to the token, generate a second address according to the first address and license, and send the second address to the first browser plugin module.

Figure 6:
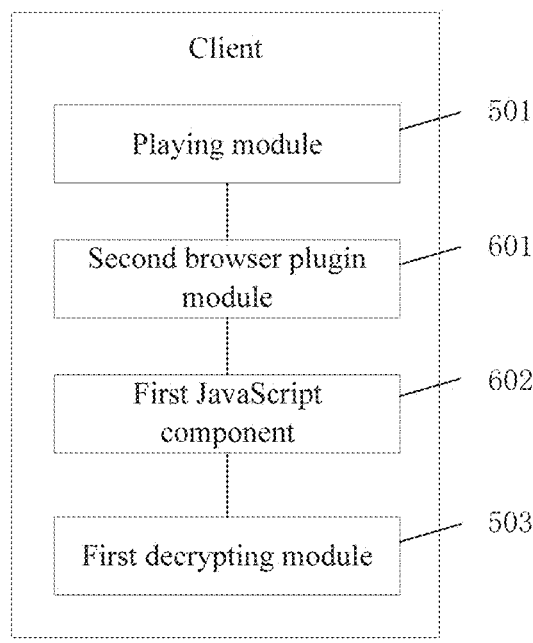
FIG. 6 is a schematic functional structural diagram of a client for implementing digital rights management according to some embodiments of the present disclosure.

Turning to FIG. 6, another non-limiting embodiment for a client implementing digital rights management is disclosed. As illustrated in FIG. 6, which is a non-limiting schematic functional structural diagram of a client for implementing digital rights management, includes a client end comprising the playing module 501, a second browser plugin module 601, a first JavaScript component 602, and the first decrypting module 503. In a similar manner as discussed above in relation to FIG. 5, the client and modules discussed in relation to FIG. 6 can be a special purpose machine or processor, and can include additional or fewer modules.

The second browser plugin module 601 is configured to acquire and send the first address and token to the first decrypting module; and acquire and send the second address to a first JavaScript component.

The first JavaScript component 602 is configured to acquire and send the second address to the playing module.

Figure 7:
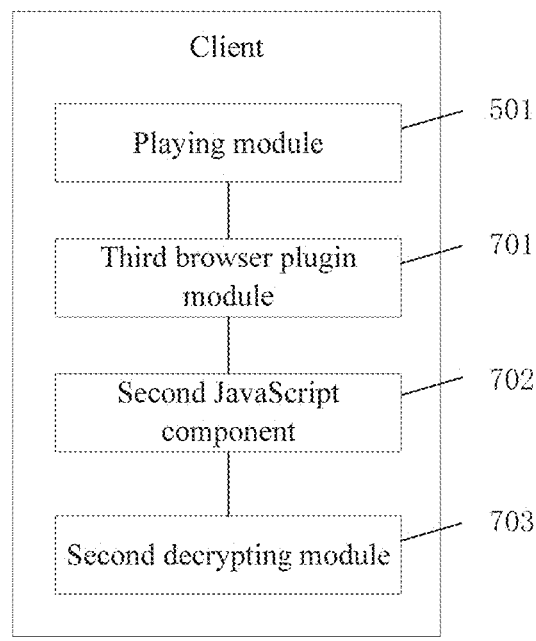
FIG. 7 is a schematic functional structural diagram of a client for implementing digital rights management according to some embodiments of the present disclosure.

Turning to FIG. 6, another non-limiting embodiment for a client implementing digital rights management is disclosed. As illustrated in FIG. 7, which is a non-limiting schematic functional structural diagram of a client for implementing digital rights management, includes a client end comprising the playing module 501, a third browser plugin module 701, a second JavaScript component 702, and a second decrypting module 703. In a similar manner as discussed above in relation to FIGS. 5-6, the client and modules discussed in relation to FIG. 7 can be a special purpose machine or processor, and can include additional or fewer modules The third browser plugin module 701 is configured to acquire and send the first address and token to the second decrypting module, send information indicating that a license is successfully acquired to a second JavaScript component, and acquire and send the second address to the playing module.

The second JavaScript component 702 is configured to acquire the information, request the second address from the second decrypting module through the third browser plugin module, and acquire and send the second address to the playing module.

The second decrypting module 703 is configured to, upon acquiring the first address and token, and a license according to the token, send the information to third browser plugin module, and upon acquiring the request, generate a second address according to the first address and license, and send the second address to the third browser plugin module.

Figure 8:
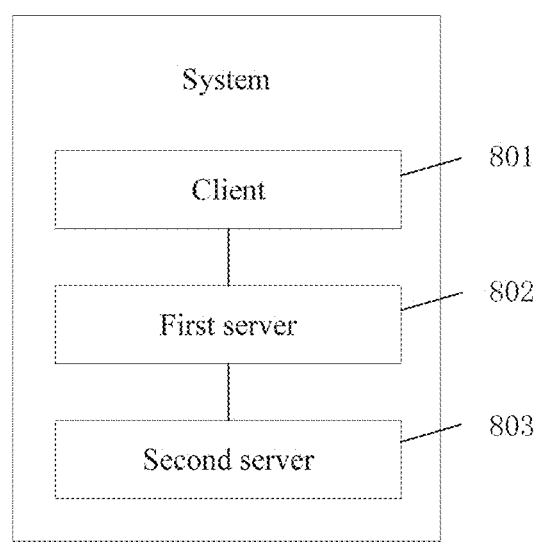
FIG. 8 is a schematic functional structural diagram of a system for implementing digital rights management according to some embodiments of the present disclosure.

Turning to FIG. 8, a non-limiting system embodiment is disclosed for implementing digital rights management. As illustrated in FIG. 8, the system comprises a client 801, a first server 802, and a second server 803, which execute and/or perform the steps discussed herein in accordance with the non-limiting embodiments discussed in relation to FIG. 5, FIG. 6, and/or FIG. 7.

The first server 802 is configured to acquire an identity of the encrypted content, acquire the first address and token according to the identity, and send the first address and token to the playing module.

The second server 803 is configured to acquire the token, generate the license according to the token, and send the license to the first decrypting module.

Figure 9:
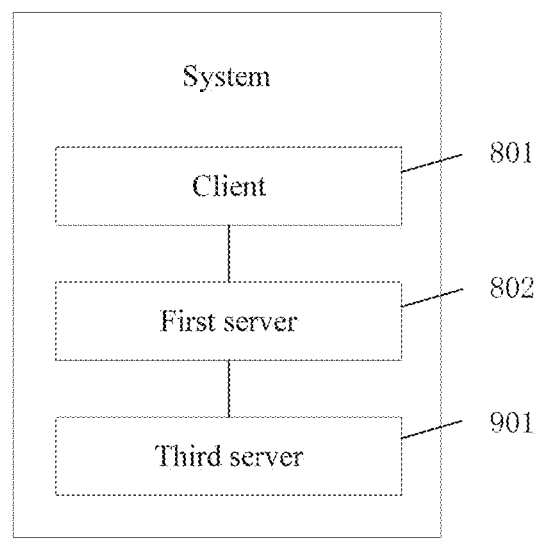
FIG. 9 is a schematic functional structural diagram of a system for implementing digital rights management according to some embodiments of the present disclosure.

Turning to FIG. 9, another non-limiting system embodiment is disclosed for implementing digital rights management. As illustrated in FIG. 9, the system comprises a client 801, a first server 802, and a third server 901, which execute and/or perform the steps discussed herein in accordance with the non-limiting embodiments discussed in relation to FIG. 5, FIG. 6, and/or FIG. 7.

The third server 901 is configured to acquire the token, generate the license according to the token, and send the license to the first decrypting module.

In the 1990s, with respect to an improvement of a technology, it may be obviously distinguished whether the improvement is made to the hardware (for example, improvement of a diode, a transistor, a switch and the like circuit structure) or to the software (for example, improvement on the method and system processes). However, with the development of technologies, at present improvements made to many method and system processes have been deemed as direct improvements of the hardware circuit structure. The designers all obtain the corresponding hardware circuit structures by programming the improved method and system processes to the hardware circuits. Therefore, the improvement of a method and system processes may also be implemented by a hardware entity module. For example, the programmable logic device (PLD), for example, the field programmable gate array (FPGA), is such an integrated circuit, and the logical functions thereof are determined by programming by the user to the device. The designers generally conduct the programming by themselves to "integrate" a digital system on a PLD, with no need to request the chip manufacturer to design and fabricate the dedicated integrated circuit chip 2. In addition, at present, the manual fabrication of the integrated circuit chip has not been used, and thus such programming may be implemented by using ("logic compiler") software instead, which is similar to the software compiler used for drafting of the program. The compilation of the original code also needs the specific programming language, which is referred to as Hardware Description Language (HDL). However, there are a variety of HDLs, for example, Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL) and the like. The currently prevailing languages are Very-High-Speed Integrated Circuit Hardware Description Language (VHDL) and Verilog2. A person skilled in the art is also clear that the hardware circuit of the logic method and system processes may be easily implemented only requiring the logic programming is performed for the above hardware description languages, and the hardware description languages are programmed into the integrated circuit.

According to some embodiments, a controller may be implemented in various suitable manners. For example, the controller may be implemented in the form of a microprocessor or processor, a (non-transitory) computer readable media storing computer readable program code (for example, software or firmware) which is executable by the (micro) processor, a logic gate, a switch, an application specific integrated circuit (ASIC), a programmable logical controller or an embedded microcontroller. Examples of the controller may include, but not limited to, the following microcontrollers: ARC 625D, Atmel AT91SAM, Microchip PIC18F26K20 and Silicone Labs C8051F320; and the memory controller may be implemented as a portion of the control logic of the memory.

A person skilled in the art knows that the methods and steps may completely perform logic programming in the form of a logic gate, switch, application specific integrated circuit, programmable logic controller and embedded microcontroller to implement the same function in addition to implementing the controller by using a pure computer readable program code. Therefore, this kind of the controller is deemed as a hardware component, and a device for implementing various functions which is included in the controller may also be deemed as an inner structure of the hardware component. Or even, the device for implementing various functions may be deemed as a software module for implementing the methods, and deemed as an inner structure of the hardware component either.

Systems, devices, modules, or units illustrated in the above embodiments may be specifically implemented by using computer core or entity, or may be implemented by using products having specific functions.

For ease of description, in the description, the devices are divided into various units according to function for separate description. Nevertheless, the function of each unit is implemented in the same or a plurality of software and/hardware when the application is implemented.

As known from the above description of the embodiments of the present application, a person skilled in the art may clearly acknowledge that the present application may be implemented by means of software plus a mandatory universal hardware platform. Based on such understanding, portions of the technical solutions of the present application that essentially contribute to the related art may be embodied in the form of a software product, the computer software product may be stored in a storage medium, such as a ROM/RAM, a magnetic disk, a CD-ROM and the like, including several instructions for causing a computer device (a personal computer, a server, or a network device) to perform the various embodiments of the present application, or certain portions of the method of the embodiments.

Various embodiments in the specification are described in a progressive manner. The same or similar parts between the embodiments may be referenced to each other. In each embodiment, the portion that is different from other embodiments is concentrated and described. In particular, with respect to a system, since it is substantially similar to the method embodiment, brief description is given. The related portions may be referenced to the description of the portions in the method embodiments.

The present application is applicable in various universal or dedicated computer system environments or configurations, for example, a personal computer, a server computer, a handheld device or portable device, a tablet device, a multi-processor system, a microprocessor-based system, a set-top box, a micro-computer, a macro-computer, a programmable consumer electronic device, a network-based PC, or any distributed computer environments comprising the above system or device.

The present application may be described in the general context of the computer executable instructions executed by the computer, for example, a program module. Generally, the program module comprises a routine, a program, an object, a component or a data structure for executing specific tasks or implementing specific abstract data types. The present application may also be practiced in the distributed computer environments. In such distributed computer environments, the tasks are executed by a remote device connected via a communication network. In the distributed computer environments, the program module may be located in the local and remote computer storage medium including the storage device.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method for implementing digital rights management, comprising:
   upon acquiring a first address and token of encrypted content, sending, by a playing module executing in a browser of a computing device, the first address and token to a browser plugin module via an application programming interface (API) exposed by the browser plugin module, the playing module delivered to the browser via a network request and the browser plugin module comprising a compiled application included in the browser;
   receiving, by a decrypting module executing on the computing device from the browser plugin module, the first address and token, the decrypting module and browser plugin module communicating via native function calls;
   identifying, via the computing device, a license based on the token;
   generating, by the decrypting module executing on the computing device, a second address according to the first address and the license, said second address being an address of decrypted content associated with said encrypted content;
   sending, via the computing device, said second address to the browser plugin module; and
   facilitating playing, via the playing module executing on the computing device, of the decrypted content in accordance with the second address via the browser plugin module.

2. The method according to claim 1, further comprising:
   receiving, by a JavaScript component executing on the computing device from the browser plugin module, the second address; and
   communicating, by the JavaScript component, the second address to the playing module.

3. The method according to claim 1, wherein before the playing module acquires the first address and token, the method further comprises:
   acquiring, by the playing module, an identity of the encrypted content, sending the identity to a first server, and requesting the first address and token from the first server; and
   acquiring, by the playing module, the first address and token returned by the first server.

4. The method according to claim 3, wherein upon the requesting the first address and token from the first server, the method further comprises:
   acquiring, from the first server, the identity, and the first address and token according to the identity, and receiving, at the playing module, the first address and token.

5. The method according to claim 1, wherein before the decrypting module acquires the first address and token, the method further comprises:
   sending, by the decrypting module, the token to a second server, and requesting the license from the second server; and
   acquiring, by the decrypting module, the license returned by the second server.

6. The method according to claim 5, wherein upon the requesting the license from the second server, the method further comprises:
   acquiring, from the second server, the token;
   generating the license according to the token; and
   communicating the license to the decrypting module.

7. The method according to claim 1, further comprising:
   downloading the encrypted content according to the first address;
   decrypting the downloaded encrypted content according to the license, and obtaining the decrypted content; and
   generating the second address according to the decrypted content.

8. The method according to claim 1, further comprising:
   downloading the encrypted content according to the first address;
   decrypting the downloaded partial encrypted content according to the license while downloading the encrypted content, and obtaining the decrypted content; and
   generating the second address according to the decrypted content.

9. The method according to claim 1, wherein the browser plugin module comprises an Netscape Plugin Application Programming Interface (NPAPI)-based browser plugin module, and an ActiveX-based browser plugin module.

10. The method according to claim 1, wherein:
    the decrypting module comprises an ExpressPlay software development kit (SDK); and
    the second address comprises a HyperText Transfer Protocol (HTTP) Live Streaming address.

11. The method according to claim 1, wherein:
the encrypted content comprises encrypted video and encrypted audio; and
the decrypted content comprises decrypted video and decrypted audio.

12. A method for implementing digital rights management, comprising:
acquiring, via a computing device, a first address and a token of encrypted content;
upon acquiring the first address and token, sending, by a playing module executing in a browser of a computing device, the first address and token to a browser plugin module via an application programming interface (API) exposed by the browser plugin module, the playing module delivered to the browser via a network request and the browser plugin module comprising a compiled application included in the browser;
receiving, at decrypting module executing on a computing device from the browser plugin module, the first address and token, the decrypting module and browser plugin module communicating via native function calls;
identifying, via the computing device, a license based on said token;
upon acquiring the first address and token, and a license according to the token, sending, by the decrypting module executing on the computing device to the browser plugin module, information indicating that the license is successfully acquired;
receiving, at JavaScript component executing on the computing device, said indicating that the license is successfully acquired;
requesting, via the decryption module executing on the computing device, a second address, the second address being an address of decrypted content;
generating, by the decrypting module executing on the computing device, the second address according to the first address and the license;
sending, via the computing device, the second address to the browser plugin module;
receiving, at JavaScript component executing on the computing device, the second address
sending, by the JavaScript component executing on the computing device, the second address to the playing module; and
facilitating playing, via the playing module executing on the computing device, the decrypted content in accordance with the second address.

13. The method according to claim 12, further comprising:
requesting, by the JavaScript component, the second address from the browser plugin module;
receiving, at the decrypting module in response to said second address request, request for the second address; and
sending the second address from the decrypting module.

14. The method according to claim 12, further comprising:
acquiring, by the playing module, an identity of the encrypted content, sending the identity to a first server, and requesting the first address and token from the first server; and
acquiring, by the playing module, the first address and token returned by the first server.

15. The method according to claim 14, further comprising:

receiving, at the playing module from the first server, the identity, and the first address and token according to the identity.

16. The method according to claim 12, further comprising:
sending, by the decrypting module, the token to a second server, and requesting the license from the second server; and
acquiring, by the decrypting module, the license returned by the second server.

17. The method according to claim 16, further comprising:
receiving, by the decrypting module from the second server, the token, generating the license according to the token.

18. A non-transitory computer-readable storage medium, tangibly encoded with computer executable instructions, that when executed by a processor, perform a method comprising:
upon acquiring a first address and token of encrypted content, sending, by a playing module executing in a browser of a computing device, the first address and token to a browser plugin module via an application programming interface (API) exposed by the browser plugin module, the playing module delivered to the browser via a network request and the browser plugin module comprising a compiled application included in the browser;
receiving, by a decrypting module executing the computing device from the browser plugin module, the first address and token, the decrypting module and browser plugin module communicating via native function calls;
identifying, via the computing device, a license based on the token;
generating, by the decrypting module executing by the computing device, a second address according to the first address and the license, said second address being an address of decrypted content associated with said encrypted content;
sending, via the computing device, said second address to the browser plugin module; and
facilitating playing, via the playing module executing on the computing device, of the decrypted content in accordance with the second address via the browser plugin module.

19. A non-transitory computer-readable storage medium, tangibly encoded with computer executable instructions, that when executed by a processor, perform a method comprising:
acquiring a first address and a token, said first address being a network address of encrypted content and said token being a token of said encrypted content;
upon acquiring a first address and token, sending, by a playing module executing in a browser, the first address and token to a browser plugin module via an application programming interface (API) exposed by the browser plugin module, the playing module delivered to the browser via a network request and the browser plugin module comprising a compiled application included in the browser;
receiving, at decrypting module from the browser plugin module, the first address and token, the decrypting module and browser plugin module communicating via native function calls;
identifying a license based on said token;

upon acquiring the first address and token, and a license according to the token, sending, by the decrypting module to the browser plugin module, information indicating that the license is successfully acquired;

receiving, at JavaScript component, said indicating that the license is successfully acquired;

requesting, via the decryption module, a second address, the second address being an address of decrypted content;

generating, by the decrypting module, the second address according to the first address and the license;

sending the second address to the browser plugin module;

receiving, at JavaScript component, the second address sending, by the JavaScript component, the second address to the playing module; and facilitating playing, via the playing module, the decrypted content in accordance with the second address.

20. A system comprising:

a processor;

a non-transitory computer-readable storage medium for tangibly storing thereon program logic for execution by the processor, the program logic comprising:

logic executed by a processor for sending, by a playing module executed in a browser upon acquiring a first address and token of encrypted content, the first address and token to a browser plugin module via an application programming interface (API) exposed by the browser plugin module, the playing module delivered to the browser via a network request and the browser plugin module comprising a compiled application included in the browser;

logic executed by a processor for receiving, by a decrypting module from the browser plugin module, the first address and token, the decrypting module and browser plugin module communicating via native function calls;

logic executed by a processor for identifying a license based on the token;

logic executed by a processor for generating, by the decrypting module, a second address according to the first address and the license, said second address being an address of decrypted content associated with said encrypted content;

logic executed by a processor for sending said second address to the browser plugin module; and logic executed by a processor for facilitating playing, via the playing module, of the decrypted content in accordance with the second address via the browser plugin module.

* * * * *